(12) United States Patent
Piccioni

(10) Patent No.: US 9,859,938 B2
(45) Date of Patent: Jan. 2, 2018

(54) PUBLIC SAFETY SMART BELT

(71) Applicant: Robert Louis Piccioni, Rowlett, TX (US)

(72) Inventor: Robert Louis Piccioni, Rowlett, TX (US)

( * ) Notice: Subject to any disclaimer, the term of this patent is extended or adjusted under 35 U.S.C. 154(b) by 0 days.

(21) Appl. No.: 15/420,066

(22) Filed: Jan. 30, 2017

(65) Prior Publication Data

US 2017/0222676 A1    Aug. 3, 2017

Related U.S. Application Data

(60) Provisional application No. 62/289,313, filed on Jan. 31, 2016.

(51) Int. Cl.
| | |
|---|---|
| *H04W 4/04* | (2009.01) |
| *H04B 1/3827* | (2015.01) |
| *H02J 7/02* | (2016.01) |
| *H02J 7/00* | (2006.01) |
| *H04B 1/3883* | (2015.01) |
| *G06F 1/16* | (2006.01) |
| *H04L 29/08* | (2006.01) |

(52) U.S. Cl.
CPC ............ *H04B 1/385* (2013.01); *G06F 1/163* (2013.01); *H02J 7/0021* (2013.01); *H02J 7/025* (2013.01); *H04B 1/3883* (2013.01); *H04W 4/04* (2013.01); *H04W 4/046* (2013.01); *H04B 2001/3855* (2013.01); *H04L 67/12* (2013.01)

(58) Field of Classification Search
CPC ........... H04W 4/02; H04W 4/18; H04W 4/04; H04W 4/046
USPC .............. 455/402, 456.1, 456.2; 340/539.11, 340/573.1
See application file for complete search history.

(56) References Cited

U.S. PATENT DOCUMENTS 8,035,560 B1 * 10/2011 Glodz ..................... G01S 19/14
342/357.71

* cited by examiner

*Primary Examiner* — Sam Bhattacharya
(74) *Attorney, Agent, or Firm* — Wei Wei Jeang; Grable Martin Fulton PLLC

(57) ABSTRACT

A smart belt system includes a belt having a plurality of holders for holding a plurality of devices including a firearm, a baton, and an electroshock weapon, a GPS component disposed within the belt configured to track the location and movement of the belt, a microprocessor disposed within the belt, logic instructions executing by the microprocessor configured to monitor and regulate the activities of the plurality of devices and location and movement data generated by the GPS component, a wireless data communications system wirelessly communicating with an external data communications system, a data storage component accessible by the microprocessor for storing activity data of the plurality of the devices and the location and movement data of the belt generated by the GPS component.

37 Claims, 5 Drawing Sheets

PUBLIC SAFETY SMART BELT

RELATED APPLICATION

This U.S. non-provisional patent application claims the benefit of U.S. provisional patent application Ser. No. 62/289,313 filed on Jan. 31, 2016.

FIELD

The invention relates generally to a wearable computer device worn as a belt.

BACKGROUND

As public technology advances and additional hardware and software applications become available to public safety employees, the amount of space available on the "traditional" public safety utility belt to carry these devices has become limited. Another challenge is the ability to maintain power to these devices on a long term basis, throughout the shift of the public safety employee. In addition, many of these devices and applications generate data, which must be captured and stored. For many applications this data must also be transferred or uploaded either immediately or at a later time.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
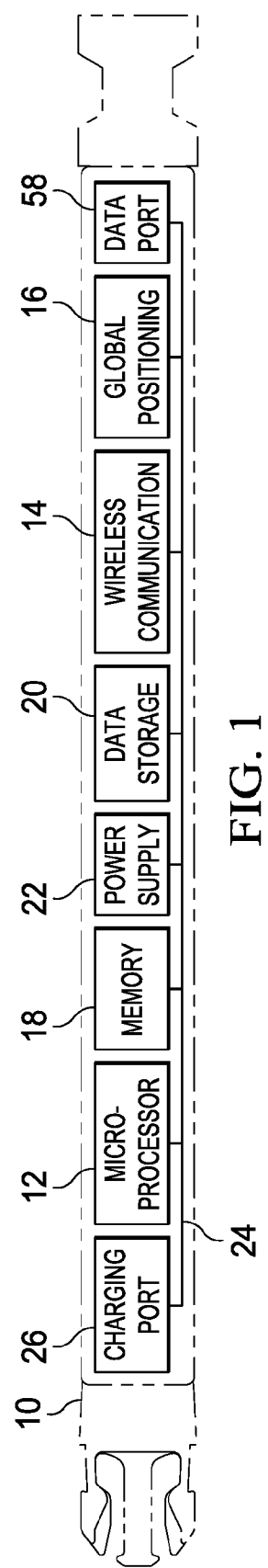
FIG. 1 is a diagram illustrating the internal components that may be wired or wirelessly connected to the smart belt according to one embodiment of the present disclosure.

Referring to FIG. 1, a wearable computer system 10, in the form of a smart belt 10 (in the form of an elongated strap and a fastener like a buckle) to be worn by a public safety employee to carry a myriad of tools. According to one embodiment of the present disclosure, the system includes a belt 10, containing an embedded computer microprocessor 12 operable to control the functions of the belt and the integration of other wired or wirelessly connected devices with the smart belt 10. The system further includes a wireless data communications system 14 disposed within the smart belt 10 that is capable of wirelessly communicatively coupling the microprocessor 12 with external data communications systems such as cellular networks, local computer networks, and global computer networks. The smart belt 10 includes one or more radio transceiver(s) and antenna to enable wireless communication of voice data, sensor data, commands, instructions, Global Positioning System (GPS) or location data, Internet data, etc.

The smart belt 10 may contain GPS components 16 to report or record the position of the smart belt or its components. Here, GPS components 16 also represent accelerometer and/or gyroscope devices that are used to detect the orientation of the smart belt and generate orientation data. In addition, the smart belt 10 includes an embedded expansion area for additional memory devices 18. Further, the smart belt 10 may incorporate a removable or fixed data storage component 20 now known or to be developed to store additional data generated by the microprocessor as well as data generated by the wired or wirelessly connected devices. Further, the smart belt 10 may contain a rechargeable power supply 22 capable of powering all of the components of the smart belt 10 as well as external components which may be integrated with the smart belt 10. The smart belt 10 may incorporate a power strip/data bus 24, disposed on the exterior or interior of the smart belt, which allows power from the power source 22 disposed within the smart belt to be transmitted to component devices that are attached to the smart belt. The power strip may also be used to provide power to the rechargeable power supply 22 and/or power the components disposed within the smart belt by attaching external power sources (power outlet, supplemental battery, etc.) via a charging port 26 to transfer the power. In addition, the smart belt may connect to a first aid component 27, described in more detail below. A data port 58 may also be incorporated in the smart belt 10 to upload, download, sync, and transmit data to and from the microprocessor 12 and data storage devices 20. The smart belt further includes a component mounting strip disposed on the exterior of the belt that facilitates the mounting of external components to the belt.

The rechargeable power supply 22 in the smart belt 10 may be charged by using inductive charging. An inductive charging system 30 is incorporated within the driver's seat 32 in a vehicle 33, and/or in a specially-equipped chair 34 in a home, office facility or other location to charge the power supply in the smart belt 10. The inductive charging system 30 is incorporated in the seats so that it may inductively couple and charge the power supply 22 in the smart belt 10. The inductive charging system 30 is preferably embedded in the back portion of the vehicular seat or office seat. In this manner, whenever a public safety officer wearing a smart belt 10 is sitting in a seat 32 or 34 equipped with the charging system 30, the smart belt power supply 22 receives additional electrical charge to replenish its charge. The user does not need to plug the power supply to an outlet or connect any wires or connectors. Charging occurs when the smart belt 10 comes into proximity with the inductive charging system 30, such as when the wearer is seated in the vehicular or office seat 32 or 34. Contactless inductive energy transfer is known in the art as a convenient way to transfer energy. See for example U.S. Pat. Nos. 6,490,176 and 5,959,433, and published United States patent applications, Publication Nos. US 2004/0189,246 and US 2004/0145,343.

The power supply 22 in the smart belt is capable of supplying power to all of the devices coupled to and held by the smart belt via the power strip/data bus 24. The devices are held in sockets or holders that have electrical connections to the power strip/data bus 24 to enable the power and data distribution. The microprocessor 12 is also capable of detecting the power level in any device waning and to distribute power from the batteries of one or more other devices to devices that have low power charge. The microprocessor 12 may also prioritize the devices in the smart belt so that power may be taken from the lower priority devices and distributed to the higher priority devices.

Figure 2:
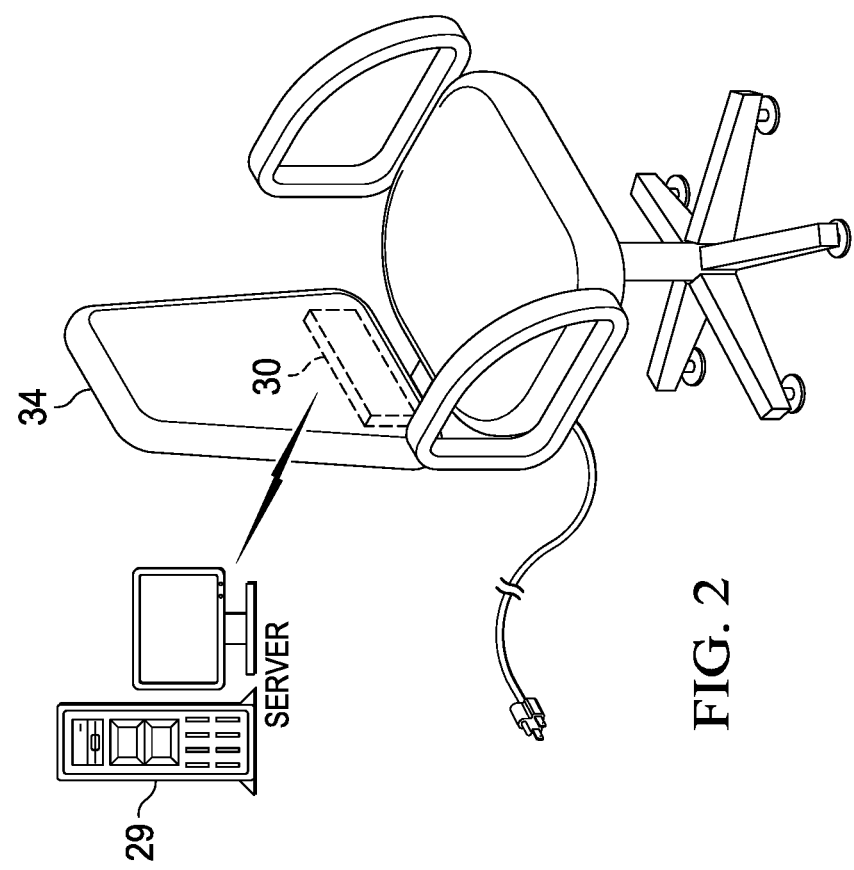
FIGS. 2 and 3 are diagrams illustrating the seat mounted inductive charging configurations according to one embodiment of the present disclosure.
Figure 3:
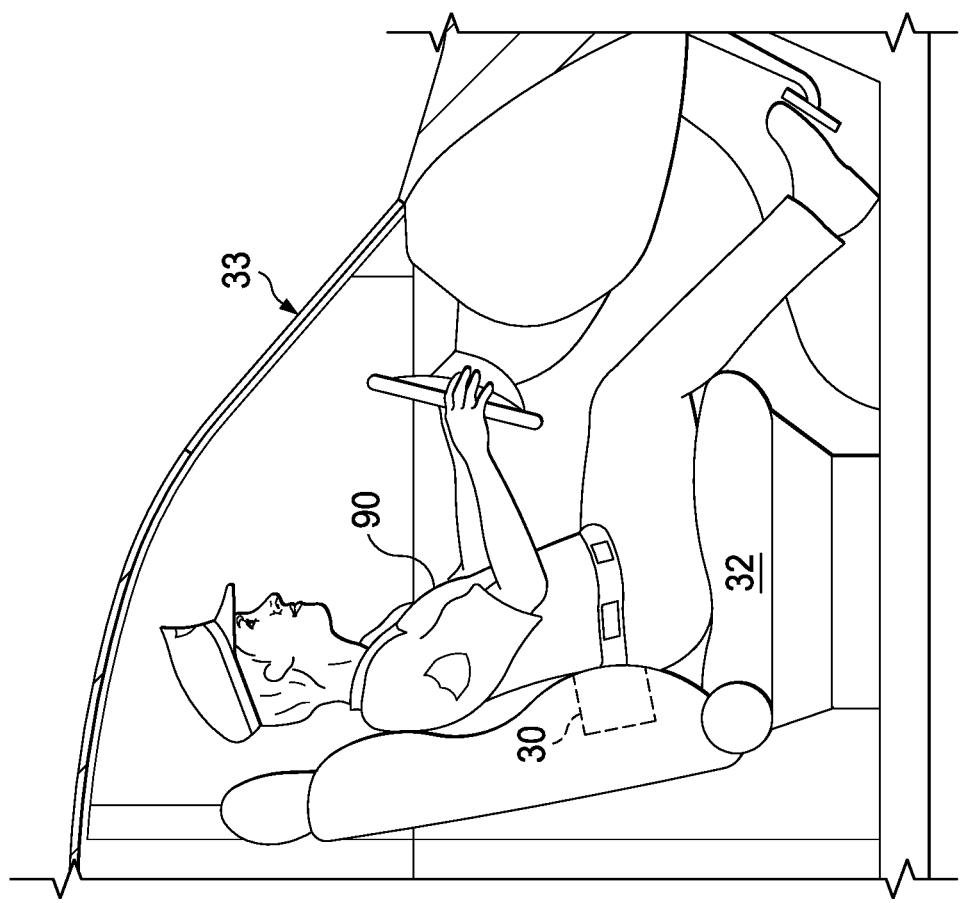
Figure 4:
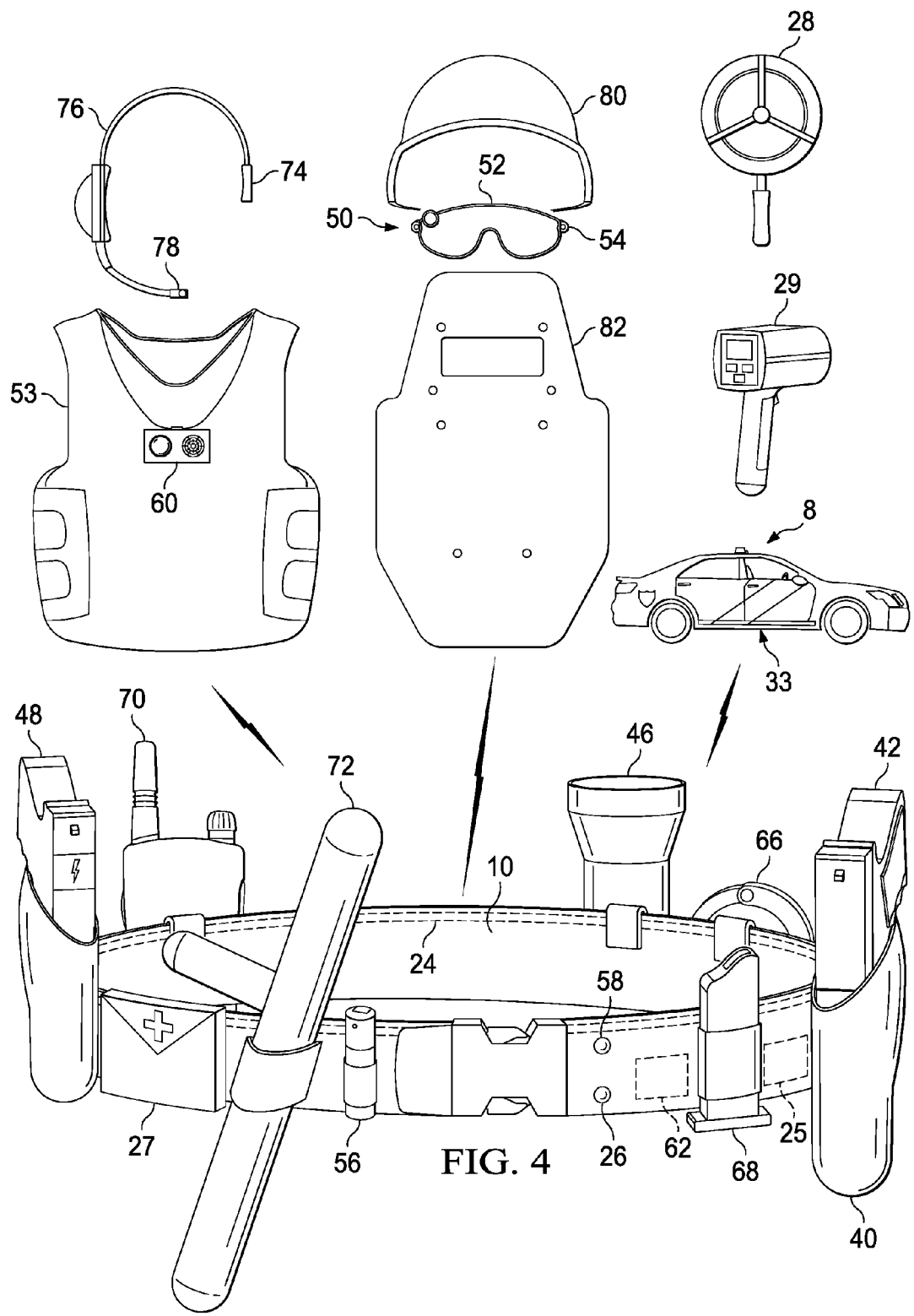
FIG. 4 is an illustration of a myriad of external and internal public safety components wired or wirelessly coupled to the smart belt according to one embodiment of the present disclosure.
Figure 5:
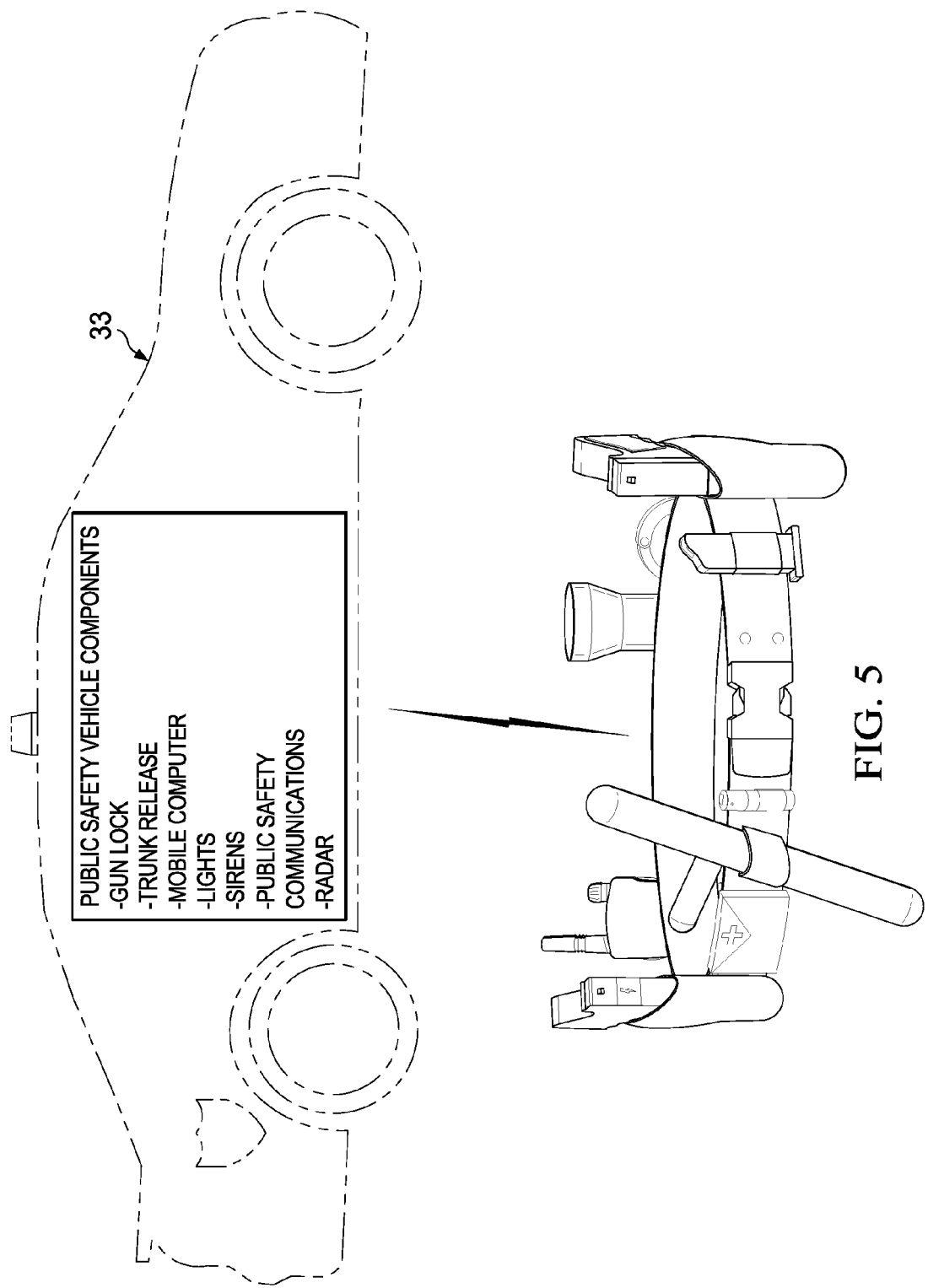
FIG. 5 is an illustration of a public safety vehicle and its components wired or wirelessly connected to the smart belt according to one embodiment of the present disclosure.

In addition, the smart belt 10 may interface with external electronic components wired or wirelessly connected to the smart belt. By way of example, one such component may be a holster 40 (FIG. 2) that is capable of detecting when a gun 42 is removed from the holster, the number of bullets in the weapon 42, the mechanical status of the weapon, etc. Further, each external component may be equipped with location and orientation detection mechanism such as GPS/accelerometer/gyroscope devices that can detect the position and orientation of the component (e.g., directional, relative to orientation of the smart belt, and with respect to horizontal/vertical). The microprocessor in the smart belt is configured to receive this information and monitor their position/orientation relative to the wearer. An analysis of this data may include determining that the position of a component is too distant from the location of the smart belt wearer, and displaying/sounding a warning message along with the location of the component to the wearer, other smart belts, other persons or to a central public safety dispatch or control center. The microprocessor in the smart belt may also be configured to enable or disable devices or certain functionalities of a device, based on the position or orientation of the device in comparison to the smart belt or the distance of the device from the smart belt. The holster 40 may also incorporate a mechanism or mechanical lock that would prevent an unauthorized user from removing the weapon 42 from the holster 40 if certain biometric requirements (e.g., fingerprints, handprint, etc.) are not met. The holster 40 may also work in conjunction with the other belt components. For example, when the weapon 42 is removed from the holster 40, it may also cause the video recording system associated with the smart belt 10 to activate and begin recording. In addition, the removal of the weapon 42 may cause the GPS component 16 of the smart belt 10 to send the wearer's location to other public safety officers in the area or to a central public safety dispatch or control center. The orientation of the weapon 42 is also sensed and relayed to the microprocessor in the smart belt and used in analytics. The microprocessor 12 disposed within the smart belt 10 may control and coordinate the interaction of all connected components on the smart belt 10 to determine the proper action to be taken by any component on the officer's person or in the patrol vehicle when one or more of the components are activated. The microprocessor 12 may also record the status/activity/GPS coordinates/orientation of the components and store and/or transfer the status/activity data. The microprocessor 12 may also send an alert to other public safety employees or to a central public safety dispatch center or control center, if a certain component or components are activated. The smart belt 10 may convey information/data to the wearer using a number of ways, such as providing a visually-perceivable display on a pair of goggles or eyewear 52, and providing aurally-perceivable information using speakers/earbuds 76, etc. The public safety personnel may receive visual/graphical/audio information related to all of the components associated with the smart belt, including power levels, location/orientation, operating status, central dispatch communications, low fuel level of the vehicle, warning messages, etc.

Examples of what may constitute proper action that can be taken automatically include: logging the location, orientation, and acceleration/movement of the officer/vehicle/external component(s), begin recording audio/video, begin analysis of audio/video information, begin relaying audio/video information to central dispatch/station, relay officer's physiological data to central dispatch, sound siren of the vehicle, and turn on an emergency light bar 8 on the vehicle.

The following components, may communicate wired or wirelessly with the smart belt 10:

A radar component 29. The radar component 29 may be a handheld unit, a remote fixed or portable device or a device integrated with the public safety vehicle. When it is activated and being used to measure the speed of passing vehicles, it may relay the measured speed to the microprocessor in the smart belt in a wired or wireless manner, which may project it for viewing by the wearer on the eyewear and/or a display in the vehicle, whichever one that is best suited for the user. If the measured speed exceeds the posted legal speed, the video information captured of the speeding vehicle's license plate and the driver's facial features are automatically analyzed using character recognition and facial recognition software to identify the license plate and the speed violator.

A flashlight component 46. In one embodiment, a flashlight component 46 wired or wirelessly connected to the smart belt 10 may be charged and monitored via the smart belt. If the smart belt 10 detects a problem (i.e., low battery, defective bulb/battery/switch) it may take action to correct the problem or alert the wearer to the problem. If the flashlight device 46 is activated, the smart belt 10 may record the date/time and location/orientation of the device prior to, during and after the activation, further activate any other components of the smart belt 10 as programmed, further send a notification or alert of the activation or status of the device 46.

A taser, stun gun, or an electroshock weapon component 48. In one embodiment, the electronic weapon 48 is wired or wirelessly connected to the smart belt and its power supply may be charged and monitored via the smart belt 10. If the smart belt 10 detects a problem (e.g., low battery, defective probe/battery/switch) it may take action to correct the problem or alert the wearer to the problem. If the electronic weapon device 48 is activated, the smart belt 10 may record the date/time and location/orientation of the device prior to, during and after the activation, further activate any other components of the smart belt as programmed, and further send a notification or alert of the activation or status of the device 48.

A facial recognition system. In one embodiment, facial recognition software installed and executing in the microprocessor 12 may work in conjunction with a video camera 50 and/or 60 wired or wirelessly connected to the smart belt 10. The video camera 50 and/or 60 may be mounted on protective eyewear 52 worn by the user or on an armored vest 53, clothing 90, or smart belt 10 worn by the user, for example. The video camera is operable to scan the faces and postures of people encountered by the wearer of the smart belt 10 and transmit the image data to the smart belt 10 or a remote database or software application for analysis and to take proper action.

A night vision system 54. The night vision system 54 is coupled the eyewear 52 to enables the wearer of the eyewear 52 to see in environments of low ambient light. In one embodiment, the night vision component 54 is wired or wirelessly connected to the smart belt and may provide 360-degree perimeter movement detection in low light circumstances for the wearer of the smart belt 10, record the activity and the time/date/geographical location of the activity, and transfer the information to the smart belt to take proper action.

A chemical spray component 56. In one embodiment, the chemical spray component 56 is wired or wirelessly connected to the smart belt 10 and may be monitored via the smart belt. If the smart belt 10 detects a problem (e.g., outdated chemicals, low chemical supply, chemical leakage, etc.) it may take action to correct the problem or alert the wearer or a third party of the problem. If the device 56 is activated, the smart belt may record the date/time and location/orientation of the device prior to, during and after the activation, activate any other components of the smart belt as programmed, and further send a notification or alert of the activation or status of the device.

A gunshot detection component 28. In one embodiment, the gunshot detection device 28 may be incorporated into the smart belt and may include one or more microphones that is wired or wirelessly connected to the microprocessor 12 of the smart belt 10 and may sense the sound of a gunshot in the vicinity of the smart belt wearer. Software installed in the microprocessor 22 or elsewhere in the smart belt 10 is capable of analyzing the audio data and detect gunshots from received audio signals. In addition, the smart belt may receive wireless data from remotely mounted gunshot detection listening devices 28. Once detected, the detection may trigger the activation of other smart belt associated components such as the night vision component 54, video recorder component 60, GPS component 16, and the communication component 14, to automatically send the information to other public safety employees or a public safety facility or other smart belts. It may also use data received via the gunshot detection device 28 or other devices to mathematically or visually determine the possible location of the origin of the gunshot and map the location to be displayed to the wearer of the smart belt visually via glasses with video and graphical capabilities that are wired or wirelessly associated with the smart belt.

An environmental sensor component 62. In one embodiment, the environmental sensor component 62 is wired or wirelessly connected to the microprocessor 12 of the smart belt 10 and may detect chemical or biological hazards in the environment of the smart belt wearer, take action by activating additional components of the smart belt, and notifying the wearer of the smart belt 10 and others.

An audio recording component. In one embodiment, the audio recording component is part of the video recording component 60 described above, but they be separate independent subsystems. The audio recording component 60 is wired or wirelessly connected to the smart belt 10 and may be voice activated and integrate with the Global Positioning system component 16 and be either manually activated to begin recording or begin recording based on certain criteria, e.g., the detection of sound at a certain geographical location. For example, if a police officer is at the police station the device will not record, however is the officer in proximity to residence known for illegal drug activity it may begin to automatically record. In another embodiment, the audio recording device may integrate with voice recognition software to allow the public safety employee to control the function of the smart belt and the wired or wirelessly connected external or internal components via voice commands. In another embodiment, the audio recording component may integrate with a voice recognition component operable to compare the audio pattern and characteristics of voices detected to a digital library of known voices to identify the person detected. Further, the audio recording component may be integrated the video eye glasses 52 that are wired or wirelessly connected to the smart belt 10 to display the picture and information to the smart belt wearer based on the identification of the individual by the audio recording component.

A video recording component 60. In one embodiment, the video recording component is wired or wirelessly connected to the smart belt and may be voice activated and integrate with the Global Positioning component and be either manually activated to begin recording or begin based on the detection of sound at a certain geographical location. For example, if a police officer is at the police station the device will not record, however is the officer in proximity to residence known for illegal drug activity it may begin to automatically record received video signals. In another embodiment, the video recording component 60 may integrate with the facial recognition component. If the facial recognition component identifies a person or persons in the officer's vicinity with an arrest/conviction record and/or a history of aggression on police officers, it may begin recording. In another example, if firefighting personnel wearing smart belts are at the scene of a fire and the facial recognition component identifies a known arsonist in the area around the fire personnel wearing smart belts, the recording component may activate and also send the information from the video recording component and the global positioning component or via an electronic alert or other message to a central command and/or public safety employees or other personnel in the area who are also wearing their smart belts.

A handcuff component 66. In one embodiment, the handcuff component 66 is wired or wirelessly connected to the smart belt 10 and when the handcuff 66 is removed from its case in the belt, the GPS component 16 is activated to automatically record the location and also to activate the audio component and/or video component to document the surrounding activity, including the arrest.

A first aid component 27. In one embodiment, one or more items such as a tourniquet may be part of a first aid component 27 that are wired or wirelessly connected to the smart belt 10. The removal of the tourniquet and/or another from the first aid component would automatically cause the activation of the communication component to send a live or pre-recorded message to the public safety dispatch center or other public safety employees or other personnel in the vicinity. It may also automatically trigger the location stamping of the location by the GPS component 16, the location being sent with the message by the communication component to a central dispatch or communications center or to other public safety employees or other personnel or other smart belt wearers in the vicinity.

An ammunition storage component 68. In one embodiment, the ammunition storage component 68 is wired or wirelessly connected to the smart belt 10 and may monitor the age or condition of the ammunition contained in the ammunition storage component 68 and notify the wearer of the smart belt (via the microprocessor 12) if a problem is detected with the ammunition. In addition, the component may recognize incompatible ammunition as compared to the weapon 42 detected in the firearm holster component 40 and compare the information and notify the wearer of the smart belt 10. In addition, when ammunition is removed from the ammunition storage component 68 it may cause other components wired or wirelessly connected to the smart belt 10 to activate and operate.

A communication device component 70. In one embodiment, the communication device 70 is wired or wirelessly connected to the smart belt 10 and allows two-way audible communications between the smart belt wearer and other smart belt wearers or a public safety dispatch center. The communication device component may also function to transfer data to and from the smart belt or the external or internal components wired or wirelessly connected to the smart belt, to and from external computer systems, voice or data analytics systems or voice or data storage systems. The communication device component may also work in conjunction with a software component disposed within the smart belt or the smart belt components, to identify components in need of software updates and transmit the data related to the update to the component.

A baton component 72. In one embodiment the baton device 72 is wired or wirelessly connected to the smart belt 10 and works in conjunction with software disposed in the baton component 72 or the smart belt 10, the software component working in conjunction with the microprocessor 12 in the smart belt 10 to recognize the removal of the police baton 72 from the smart belt and cause the GPS component 16 to create a digital stamp of the location/orientation of the device prior to, during or after deployment, the communications device component 70 to send a notification to other smart belt users in the area or a police dispatch facility indicating that the baton 72 has been removed from its holster. The baton's removal may also cause the audible recoding component, the video recording component, and the facial recognition component to be activated and begin recording. The baton device 72 may also have a biometric component that detects usage by unauthorized person and activates other components of the smart belt and takes action to notify other public safety employees, other smart belts and/or a public safety dispatch center.

A holster component 40. In one embodiment, the holster 40 is wired or wirelessly connected to the smart belt 10, with the weapon 42 contained within the smart belt wired or wirelessly connected to either the holster or the smart belt. The holster may monitor the condition and status of the weapon contained within the holster including, but not limited to the number of bullets in the weapon, if there is a bullet in the chamber of the weapon, the status of the weapon, the number of rounds fired by the weapon and the caliber of the weapon. The holster or smart belt may further detect the removal of the weapon 42 from the holster 40 and the removal of the weapon from the holster may further cause the holster or the smart belt to further activate the audio recording component, the global positioning component, the video recording component, the communications component, the night vision component, and/or the eyewear component or any other component of the smart belt A firearm component 42. In one embodiment, the firearm is wired or wirelessly connected to the smart belt 10, the smart belt 10 operable to monitor the status of the firearms component including the readiness of the firearm to fire, the usage history of the firearm including the number of times it has been removed from the holster and fired and the location/orientation of the firearm prior to, during or after the firearm is fired. The firearm 42 may also contain a biometric component that prohibits unauthorized users from using the weapon by reporting the biometric information to the smart belt, the smart belt operable to determine that the user is not authorized and disabling the weapon, and further activating other components of the smart belt including but not limited to the GPS component 16, the video recording component, the communications component and the audio recording component. The smart belt 10 may also notify other smart belt users, other public safety employees or a public safety dispatch center of the status of or use or attempted use of the weapon.

In addition, the wireless communications component 14 disposed within the smart belt may act to receive software updates for the smart belt itself, as well as the components connected wired or wirelessly to the smart belt.

In addition, the smart belt may be wired or wirelessly communicatively coupled to external devices removed from the smart belt including:

Eyewear 52 equipped with an internal projection system to provide data, images or video to the wearer received from the wearer's smart belt or its related components or received from other smart belts worn by other public safety employees.

A headset 76 incorporating a ear piece 74 and microphone 78 to provide two-way audio communication via the smart belt or its related components or received from other smart belts worn by other public safety employees.

Ballistic headwear 80. The ballistic headwear 80 or helmet being operable detect impact and measure the degree of impact to the ballistic headwear, or change in orientation of the ballistic headwear, and transfer the information to the smart belt 10 for analysis and take action.

A ballistic vest 53. The ballistic vest is able to detect impact to the ballistic vest and measure the degree of impact, or change in orientation of the ballistic vest, and transfer the information to the smart belt for analysis and take action.

A ballistic shield 82. The ballistic shield 82 is capable of detecting impact or change in orientation of the ballistic shield and transfer the information to the smart belt to take action.

In addition, the public safety vehicle 33 itself may wired or wirelessly connect as a component of the smart belt. The public safety vehicle may be equipped with sensors to detect glass breakage, intrusion, force applied to the exterior or malfunctions and transfer the information to the smart belt to take action. The sensor may detect glass breakage (sniper fire/car accident/attack while the vehicle is occupied or unoccupied) and send a warning message to the belt wearer (if away from the car) or a centralized monitoring station.

In addition, the ballistic shield 82, helmet 80, vest 53, clothing 90 (e.g., shirt, trousers, hat, shoes), and public safety vehicle may be further equipped with external or internal sensors to detect a number of variables. For example, temperature sensors may be used to determine the body temperature of the officer to detect overheating or other less than optimal environment. The officer's physiological condition may also be measured by a plurality of sensors and relayed to the smart belt. Sensors can also be incorporated to detect the presence of environmental hazards. Sensors may be incorporated into the clothing to determine whether a force exceeding a certain magnitude has been applied to any of the components, determine a velocity and direction vector of the force, and transmit the location information (received from GPS component) to the smart belt 10. The smart belt 10 is operable to analyze the received information and determine the possible location of the origin of the force/hazard, and take action by alerting the wearer or other public safety personnel in the area or a central public safety dispatch center or control center of the possible location of a suspect or threat based on the analysis.

In addition, the smart belt 10 may act as an electronic "key" to authorize the operation of the functions of the public safety vehicle 33. In one embodiment, the smart belt is wirelessly connected to the public safety vehicle and when the smart belt is in proximity to the public safety vehicle it provides a digital authorization for the vehicle to be started. In another embodiment, the smart belt provides a digital authorization for a weapon to be removed from a locking gun lock located within the vehicle. In another embodiment, the mobile data computer mounted in the public safety vehicle will accept a digital verification from the smart belt and allow access to the computers operating system by the authorized wearer of the smart belt.

In addition, the smart belt 10 worn by one public safety officer may be wired or wirelessly connected to other smart belts worn by other personnel to exchange data and information between smart belts based on proximity or other associative parameters pertaining to the wearer such as time of day, function performed, etc.

It should be noted that the phrase "wired or wirelessly connected to the smart belt 10" used herein means that a component is communicating with the microprocessor 12 and/or one or more other components/subsystems coupled or held in the smart belt 10 via a wired or wireless communication channel. It should also be noted that the sensors disposed within the holders of the smart belt 10 may be implemented by passive and/or active sensors depending on the desired application and functionality.

In addition, the headset, audio recording component or the video recording component may be operable to receive audible input commands from the wearer of the smart belt, the audible input being recognized and interpreted by a software component to allow for voice control of the smart belt or its externally or internally connected components, by the wearer of the smart belt.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A smart belt system worn by a person comprising:
   an elongated belt having a plurality of holders configured for holding a plurality of devices;
   a GPS component disposed within the belt configured to track the location and movement of the belt;
   a microprocessor disposed within the belt;
   logic instructions executing by the microprocessor configured to monitor and regulate the activities of the plurality of devices and location and movement data generated by the GPS component;
   a memory configured for storing the logic instructions disposed within the belt and accessible by the microprocessor;
   a wireless data communications system disposed within the belt configured to wirelessly communicate with an external data communications system;
   a data storage component disposed within the belt and accessible by the microprocessor for storing activity data of the plurality of the devices and the location and movement data of the belt generated by the GPS component; and
   a rechargeable power supply disposed within the belt configured for providing electrical power to the microprocessor, memory, wireless data communications system, GPS component, data storage component, and attached devices; and
   a power/data transfer strip disposed within the belt configured to facilitate transferring of data and power between the belt and the components held in the belt.

2. The smart belt system of claim 1, wherein the belt further comprises a data port to upload and download data to and from the data storage component of the belt.

3. The smart belt system of claim 1, wherein the belt further comprises a charging port configured for recharging the power supply.

4. The smart belt system of claim 1, wherein the belt further comprises an inductive power component configured to recharge the power supply by inductive coupling.

5. The smart belt system of claim 4, wherein the inductive power component is incorporated in a seat configured to inductively recharge the power supply by inductive coupling when the wearer is sitting in the seat.

6. The smart belt system of claim 1, further comprising a first aid component wired or wirelessly connected to the smart belt.

7. The smart belt system of claim 1, further comprising a flashlight component in wired or wireless communication with the microprocessor.

8. The smart belt system of claim 1, further comprising an electronic weapon component in wired or wireless communication with the microprocessor.

9. The smart belt system of claim 1, further comprising a ballistic vest component in wired or wireless communication with the microprocessor.

10. The smart belt system of claim 1, further comprising a facial recognition component in wired or wireless communication with the microprocessor.

11. The smart belt system of claim 1, further comprising a night vision component in wired or wireless communication with the microprocessor.

12. The smart belt system of claim 1, further comprising a chemical spray component in wired or wireless communication with the microprocessor.

13. The smart belt system of claim 1, further comprising a gunshot detection component in wired or wireless communication with the microprocessor.

14. The smart belt system of claim 1, further comprising an environmental sensor component in wired or wireless communication with the microprocessor.

15. The smart belt system of claim 1, further comprising an audio recording component in wired or wireless communication with the microprocessor.

16. The smart belt system of claim 1, further comprising a video recording component in wired or wireless communication with the microprocessor.

17. The smart belt system of claim 1, and further comprising a handcuff component in wired or wireless communication with the microprocessor.

18. The smart belt system of claim 1, further comprising a communication device in wired or wireless communication with the microprocessor.

19. The smart belt system of claim 1, further comprising an ammunition holder in wired or wireless communication with the microprocessor.

20. The smart belt system of claim 1, further comprising a police baton component in wired or wireless communication with the microprocessor.

21. The smart belt system of claim 1, further comprising a firearm component in wired or wireless communication with the microprocessor.

22. The smart belt system of claim 1, further comprising a weapon holster component in wired or wireless communication with the microprocessor.

23. The smart belt system of claim 1, further comprising an eyewear component in wired or wireless communication with the microprocessor.

24. The smart belt system of claim 23, further comprising the eyewear component displaying a graphical summary of the status of the belt and each component associated with the belt.

25. The smart belt system of claim 1, further comprising an earpiece component in wired or wireless communication with the microprocessor.

26. The smart belt system of claim 1, further comprising a headset component in wired or wireless communication with the microprocessor.

27. The smart belt system of claim 1, further comprising a ballistic headwear component in wired or wireless communication with the microprocessor.

28. The smart belt system of claim 1, further comprising a ballistic shield component in wired or wireless communication with the microprocessor.

29. The smart belt system of claim 1, further comprising a vehicle in wired or wireless communication with the microprocessor.

30. The smart belt system of claim 29, further comprising components mounted to the vehicle in wired or wireless communication with the microprocessor.

31. The smart belt system of claim 29, further comprising a microphone receiving voice commands from the wearer, and the microprocessor configured to take proper action in response to the received voice commands.

32. The smart belt system of claim 1, wherein the microprocessor further receives location data from each component and generate a warning to the wearer in response to determining that the location of a component is above a threshold distance from the wearer.

33. The smart belt system of claim 1, further comprising a plurality of sensors in communication with the microprocessor disposed in the plurality of holders configured to detect removal of the devices from their respective holders.

34. The smart belt system of claim 1, further comprising a plurality of sensors in communication with the microprocessor disposed in the plurality of holders configured to monitor the activity of the devices.

35. A smart belt system worn by a person comprising:
an elongated belt having a plurality of holders configured for holding a plurality of devices;
a GPS component disposed within the belt configured to track the location and movement of the belt;
a microprocessor disposed within the belt;
logic instructions executing by the microprocessor configured to monitor and regulate the activities of the plurality of devices and location and movement data generated by the GPS component;
a memory configured for storing the logic instructions and disposed within the belt and accessible by the microprocessor;
a wireless data communications system disposed within the belt configured to wirelessly communicate with an external data communications system;
a data storage component disposed within the belt and accessible by the microprocessor for storing activity data of the plurality of the devices and the location and movement data of the belt generated by the GPS component; and
a rechargeable power supply disposed within the belt configured for providing electrical power to the microprocessor, memory, wireless data communications system, GPS component, data storage component, and attached devices; and
wherein the belt includes an inductive power component configured to recharge the power supply by inductive coupling.

36. A smart belt system worn by a person comprising:
an elongated belt having a plurality of holders configured for holding a plurality of devices;
a microprocessor disposed within the belt;
logic instructions executing by the microprocessor configured to monitor and regulate the activities of the plurality of devices;
a memory configured for storing the logic instructions and disposed within the belt and accessible by the microprocessor;
a wireless data communications system disposed within the belt configured to wirelessly communicate with an external data communications system;
a data storage component disposed within the belt and accessible by the microprocessor for storing activity data of the plurality of devices; and
a rechargeable power supply disposed within the belt configured for providing electrical power to the microprocessor, memory, wireless data communications system, data storage component, and attached devices; and
a power/data transfer strip disposed within the belt configured to facilitate transferring of data and power between the belt and the components held in the belt.

37. A smart belt system worn by a person comprising:
an elongated belt having a plurality of holders configured for holding a plurality of devices;
a microprocessor disposed within the belt;
logic instructions executing by the microprocessor configured to monitor and regulate the activities of the plurality of devices;
a memory configured for storing the logic instructions and disposed within the belt and accessible by the microprocessor;
a wireless data communications system disposed within the belt configured to wirelessly communicate with an external data communications system;
a data storage component disposed within the belt and accessible by the microprocessor for storing activity data of the plurality of the devices; and
a rechargeable power supply disposed within the belt configured for providing electrical power to the microprocessor, memory, wireless data communications system, data storage component, and attached devices; and
wherein the belt includes an inductive power component configured to recharge the power supply by inductive coupling.

* * * * *